(12) United States Patent
Nazarian et al.

(10) Patent No.: US 10,603,571 B2
(45) Date of Patent: Mar. 31, 2020

(54) DIGITALLY CONTROLLED VARIABLE STIFFNESS SKI, SNOWBOARD, AND BOOTS SYSTEM

(71) Applicants: Ara Nazarian, Wellesley, MA (US); Edward K. Rodriguez, Medfield, MA (US)

(72) Inventors: Ara Nazarian, Wellesley, MA (US); Edward K. Rodriguez, Medfield, MA (US)

(*) Notice: Subject to any disclaimer, the term of this patent is extended or adjusted under 35 U.S.C. 154(b) by 0 days.

(21) Appl. No.: 15/804,938

(22) Filed: Nov. 6, 2017

(65) Prior Publication Data

US 2018/0147476 A1 May 31, 2018

Related U.S. Application Data

(63) Continuation-in-part of application No. 15/409,745, filed on Jan. 19, 2017.

(60) Provisional application No. 62/280,209, filed on Jan. 19, 2016.

(51) Int. Cl.
*A63C 5/07* (2006.01)
*A63C 5/12* (2006.01)
*A63C 9/00* (2012.01)
*F03G 7/06* (2006.01)
*A63C 10/00* (2012.01)
*A63C 10/14* (2012.01)

(52) U.S. Cl.
CPC ............... *A63C 5/07* (2013.01); *A63C 5/126* (2013.01); *A63C 9/00* (2013.01); *A63C 9/003* (2013.01); *A63C 10/00* (2013.01); *A63C 10/14* (2013.01); *F03G 7/065* (2013.01); *A63C 2203/12* (2013.01); *A63C 2203/18* (2013.01); *A63C 2203/22* (2013.01); *A63C 2203/24* (2013.01)

(58) Field of Classification Search
CPC ... F03G 7/06; F03G 7/065; A63C 5/07; A63C 13/00; A63C 2203/12; A63C 5/03
USPC ............................ 60/527–529; 310/306, 307
See application file for complete search history.

(56) References Cited

U.S. PATENT DOCUMENTS

| 4,864,860 A | 9/1989 | Manseth |
| 2003/0155740 A1* | 8/2003 | Lammer ................. A63C 5/075 280/602 |
| 2012/0276309 A1* | 11/2012 | Failing ................... G06F 17/50 428/34.1 |
| 2013/0309089 A1 | 11/2013 | Madsen et al. |

(Continued)

OTHER PUBLICATIONS

"U.S. Appl. No. 15/409,745, Preliminary Amendment filed Sep. 11, 2017", 6 pgs.

(Continued)

*Primary Examiner* — Mark A Laurenzi
*Assistant Examiner* — Mickey H France
(74) *Attorney, Agent, or Firm* — Schwegman Lundberg & Woessner, P.A.

(57) ABSTRACT

A system, method and apparatus for a digitally Controlled Variable Stiffness item of athletic equipment, such as a Ski, Snowboard, and Boots. A core of thermally responsive metal alloy, such as Nitinol is disposed within the athletic equipment. A thermal control module and controller permit the athlete to program the athletic equipment to a desired stiffness parameter. The controller may include an app operable via a mobile computing device in communication with the thermal control module.

19 Claims, 8 Drawing Sheets

(56) References Cited

U.S. PATENT DOCUMENTS

2013/0341127 A1* 12/2013 Mann .................. A63C 7/1086
  188/6
2016/0147262 A1* 5/2016 Lee ...................... G06F 1/1626
  345/173
2017/0203192 A1 7/2017 Nazarian et al.

OTHER PUBLICATIONS

"U.S. Appl. No. 15/409,745, Non Final Office Action dated Oct. 5, 2018", 14 pgs.
"U.S. Appl. No. 15/409,745, Response filed Dec. 26, 2018 to Non Final Office Action dated Oct. 5, 2018", 12 pgs.
"U.S. Appl. No. 15/409,745, Examiner Interview Summary dated Apr. 11, 2019", 4 pgs.
"U.S. Appl. No. 15/409,745, Final Office Action dated Apr. 18, 2019", 13 pgs.
"U.S. Appl. No. 15/409,745, Advisory Action dated Jul. 1, 2019", 5 pgs.
"U.S. Appl. No. 15/409,745, Notice of Allowance dated Jul. 29, 2019", 8 pgs.
"U.S. Appl. No. 15/409,745, Response filed Jun. 18, 2019 to Final Office Action dated Apr. 18, 2019", 12 pgs.
"U.S. Appl. No. 15/409,745, Response filed Jul. 18, 2019 to Advisory Action dated Jul. 1, 2019", 12 pgs.

\* cited by examiner

A: MEDIAL-FRONT EDGE
B: CENTRAL-FRONT EDGE
C: LATERAL-FRONT EDGE
D: MEDIAL-CORE EDGE
E: CENTRAL-CORE EDGE
F: LATERAL-CORE EDGE
D: MEDIAL-BACK EDGE
E: CENTRAL-BACK EDGE
F: LATERAL-BACK EDGE

DIGITALLY CONTROLLED VARIABLE STIFFNESS SKI, SNOWBOARD, AND BOOTS SYSTEM

CLAIM OF PRIORITY

This application is a continuation-in-part application of and claims priority benefit from U.S. patent application Ser. No. 15/409,745 filed on Jan. 19, 2017 and entitled "Digitally Controlled Variable Stiffness Ski, Snowboard, and Boots System," which claims priority to U.S. Provisional Patent Application No. 62/280,209, filed Jan. 19, 2016, the benefit of priority of each of which is claimed hearby, and each of which are incorporated by reference herein in it's entirety.

TECHNICAL FIELD

The present application relates generally to a variable stiffness ski.

BACKGROUND

The present invention relates to sporting equipment performance based stiffness parameters, and more particularly to modifying the stiffness parameters in a piece of sporting equipment, such as skis and snowboards.

Existing skis and snowboards are designed for specific skiing conditions (groomer, powder, off-piste, and the like) that provide better control for each skiing/snowboarding environment. This is accomplished by changes in the physical shape of the skis, the manufacturing materials and binding/boot configurations among other factors. Once manufactured, except for minor adjustments, such as waxing or binding adjustments, the performance characteristics of existing skis or snowboard are mostly fixed. As a result, none of the existing categories allow a skier/snowboarder to modify the stiffness of the ski/snowboard to adapt to changing snow conditions during the day. According to present systems and methods, various sets of skis are needed for different ski conditions or level of expertise.

For example, when a skier may start on cold and hard surface slopes, and weather conditions gradually change throughout the day to create softer or slush type snow. In addition to changing weather conditions, the snow conditions may also be affected by skier density, whereby the more skiers/boarders slide on the snow during the day, the more the snow conditions may be affected. With fixed performance characteristics built into the skis, snowboard, boots, and bindings, it has not been possible to make changes to the same equipment to accommodate changing snow conditions.

If skis are left outside, their core, top surface and bottom surface temperatures are very similar to the ambient temperature. If skis are maintained indoors the night before prior to skiing, the core, top surface and bottom surface temperatures adjust to the outside ambient temperature in 20 to 25 minutes.

As can be seen, there is a need for a more responsive ski/snowboard/boot system for the high performance and recreational skier that will allow the user to further enjoy their sport and potentially provide them with better protection against injury.

BRIEF DESCRIPTION OF THE DRAWINGS

Some embodiments are illustrated by way of example and not limitation in the figures of the accompanying drawings in which.

DETAILED DESCRIPTION

Example methods and systems for a digitally controlled, variable stiffness ski, snowboard, and boot system are described. In the following description, for purposes of explanation, numerous specific details are set forth in order to provide a thorough understanding of example embodiments. It will be evident, however, to one skilled in the art that the present invention may be practiced without these specific details. The description is not to be taken in a limiting sense, but is made merely for the purpose of illustrating the general principles of the invention, since the scope of the invention is best defined by the appended claims.

Broadly, embodiments of the present invention provide a system, method, and apparatus for an athlete to variably control the stiffness parameters of a piece of athletic equipment to select a desired performance characteristic of the equipment based on the stiffness parameter.

By way of example, the system provides a skier or a snowboarder the ability to have a single pair of skis or snowboard that have variable controllable stiffness properties in order to adapt the equipment to different snow conditions and skiing/snowboarding styles. With a set of skis, snowboard, or boots according to the present invention, a skier/snowboarder may adjust the stiffness of his or her skis, snowboard, and/or boots based on the skiing or snowboarding conditions, throughout the day, without the need to change their skis/snowboard. This will enable the skier or the snowboarder to have better control and potentially reduce risk of injury.

An item of athletic equipment, such as a ski or snowboard, according to aspects of the present invention may be seen in reference to the drawings. For purposes of non-limiting illustration, the drawings of FIGS. 1 and 2 generally depict the body of a digitally controlled variable stiffness item, that may include a ski or snowboard, and the aspects disclosed are equally applicable to each. For ease of description, an embodiment of a ski will be described, it being understood that the technology disclosed herein finds applicability to a pair of skis, a snowboard, boots, and bindings, and other articles of athletic equipment.

Figure 1:
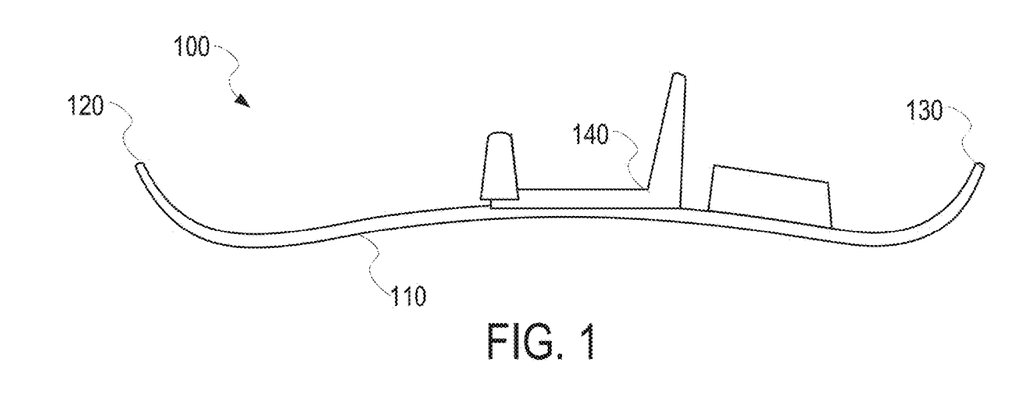
FIG. 1 is a side elevation view of an embodiment of a digitally controlled variable stiffness item, according to certain example embodiments.

As will be appreciated from the side elevational view of FIG. 1, a ski 100 comprises an elongate body 110, having a front end 120 and a back end 130. The ends 120 and 130 may be formed with an upturned tip or tail, respectively. The elongate body 110 has a substantially flat surface along its longitudinal length, with a slightly arched upward curvature intermediate the ends. A binding 140 may be mounted proximate to a midpoint of the ski 100. The binding 140 serves to releasably attach a boot to the ski 100.

Figure 2:
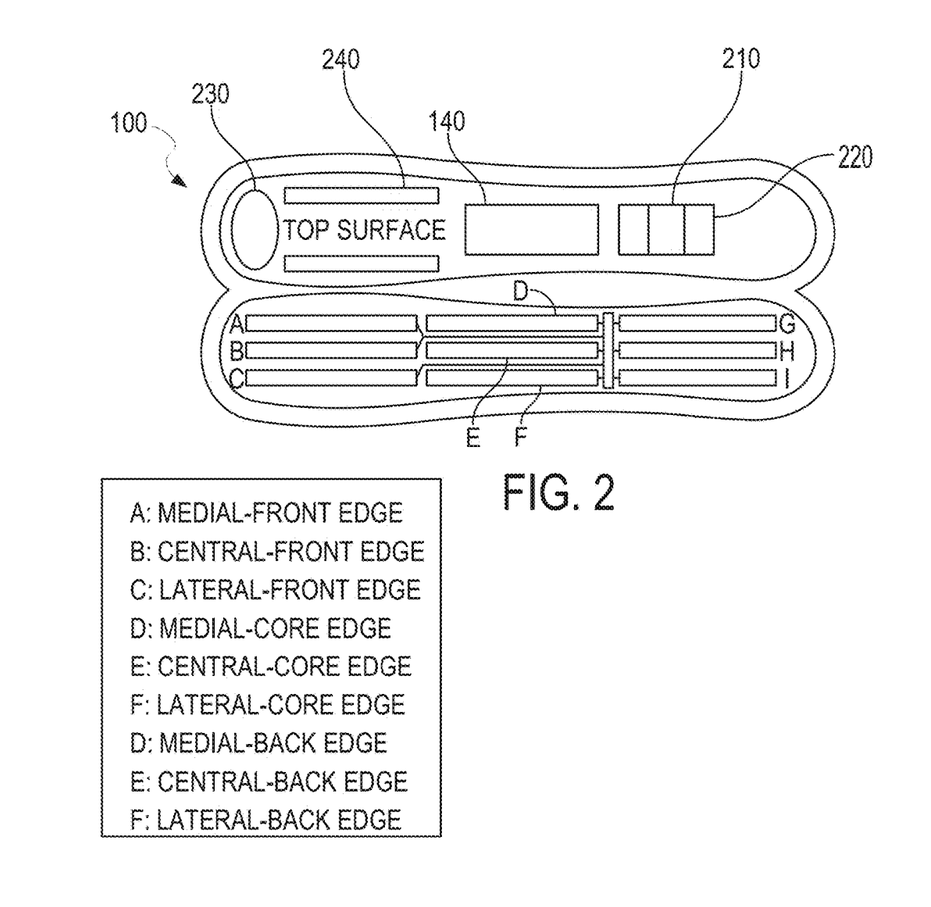
FIG. 2 is a planar view of a digitally controlled variable stiffness item, according to certain example embodiments.

Referring now to the top surface view shown in FIG. 2, a battery pack 210 and control unit 220 may be mounted to an aft portion of the ski 100, or be attached to the back of the boots, to provide a power source and control unit for operation of the system components and circuitry that may include a heating control module and a connectivity module. The control unit 220 may comprise a connectivity module and a nitinol heating control module, wherein the ski body 110 may comprise a heating element means embedded within or on a surface of the ski body 110. An upper surface of the ski 100 may include a solar panel 230, preferably located near the tip of the ski 100 (e.g., the front end 120), which may use solar radiation to produce an electric charge for the control unit 220 or other functional elements including the battery pack 210. The ski 100 may also be provided with at least one strip of a piezoelectric material 240, whereby the flexing of the ski 100 (and thereby the piezoelectric material 240), in use, will produce an electric charge.

The control unit 220 may include a battery-charging module that receives and regulates the electric charges to recharge the battery back and extend the battery life of the system. The battery pack 210 may be any suitable battery source, and is preferably a lithium ion battery. In some example embodiments, the battery pack 210 may be integrated into a riser plate to be mounted beneath the bindings 140. Riser plates are plates that may be inserted between the binding 140 and the ski 100, so adjust a height or position of the binding 140 relative to the ski 100. In further embodiments, the battery pack 210 may be configured to be removably attached to a ski boot inserted into the binding 140, such as by a clipping or other fastening means, similar to a ski-boot heater system.

FIG. 2 also depicts a plurality of variable stiffness core elements (e.g., core elements A, B, C, D, E, F, G, H, and I) disposed within the body of the ski (e.g., ski body 110), which may be arranged according to zones or regions. In some embodiments, the core elements are formed using a shape memory alloy, such as an alloy of nickel and titanium (Nitinol), which are integrally formed within the ski body 110. The core elements may be disposed replacing the metal (mostly Titanal) core used in skis for increased stiffness and durability, as part of a torsion box for higher end skis/snowboards, or as a layer in lower end skis/snowboards.

By way of non-limiting example, and as depicted in FIG. 2, the core elements may include a medial front edge core, a central front edge core, a lateral front edge core, a medial core edge, a central core edge, a lateral core edge, a medial back edge core, a central back edge core, and a lateral back edge core, according to certain example embodiments. Further embodiments may comprise any arrangements and number of core elements, including for example, 2 front and back or 3 front, middle, back core elements used in the design. The arrangement and configuration of the core elements within the equipment may be influenced by the structural properties of the other components forming the ski body (e.g., ski body 110 of FIG. 1). For example, the core elements may be embedded into the ski body (e.g., ski body 110) in two layers, such as at the top and bottom of the ski 100 for increased stiffness and variability of the stiffness. This approach will allow for increase stiffness control of top and bottom core elements at various positions along the length and width of the ski/snowboard.

Thus, when the core elements (e.g., core elements A, B, C, D, G, H, I) are heated by the heating element, the properties of the core elements induce a phase change from a softer, hyper elastic, martensitic phase to a more rigid austenitic phase. This change in phase of the core elements will thus modify the stiffness profile of the ski (e.g., ski 100) at various parts of such equipment, so that the ski may be tuned to respond to changes in terrain, ski conditions, snow quality, or expected performance.

In some example embodiments, the control unit 220 may cause one or more of the core elements to induce a phase shift, enabling the control unit 220 to control a stiffness parameter of a ski (e.g., ski 100) with a greater level of precision and resolution. In further embodiments, the control unit 220 may further be configured to cause specific core elements at specific locations along the ski body 110 to induce phase shifts of varying degrees. For example, the control unit 220 may cause core elements A, B, and C to induce a phase shift of a first degree, and core elements D, E, and F to induce a phase shift of a second degree.

Figure 3:
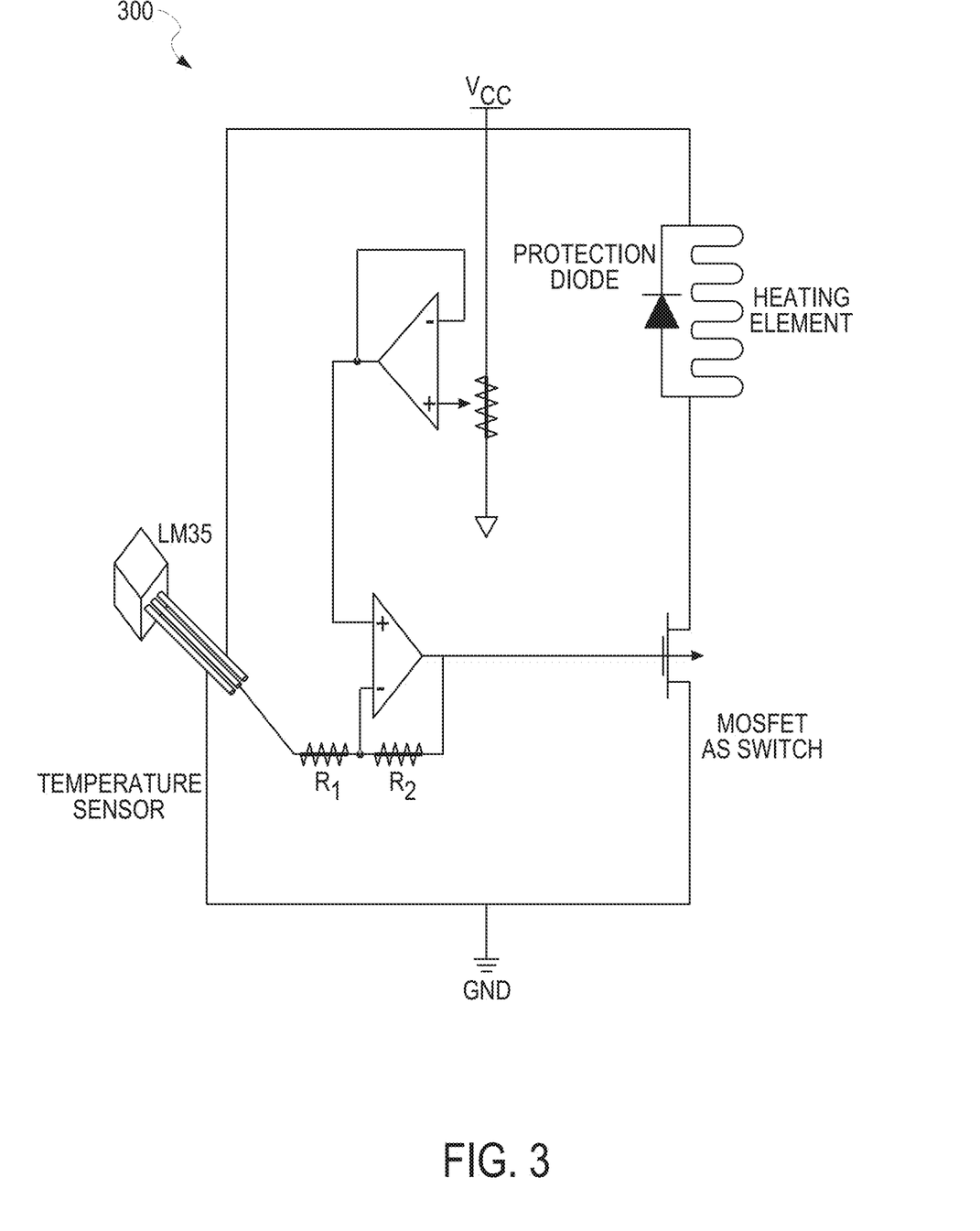
FIG. 3 is an electric circuit schematic of a control unit of a heating system, according to certain example embodiments.

FIG. 3 is an electric circuit schematic 300 of the control unit 220, according to certain example embodiments. The description is not to be taken in a limiting sense, as it describes one of the methods to control the system. The first stage of the circuit is a temperature sensor (LM35) used to constantly monitor the temperature of the ski board (e.g., ski body 110). The output of the sensor is electric voltage linearly dependent on the ski board temperature. The second stage of the circuit is for comparison of the measured voltage (measured temperature) from the sensor with the adjustable reference voltage. The reference voltage may be precisely adjusted to desired level using the resistor Vr. The difference between the measured voltage and the reference voltage will set the voltage at the gate of MOSFET to high which results in current flow through the heating element and eventually heating up the ski board. At the same time the temperature sensor will monitor the temperature increase in the board and increasing the sensor output voltage accordingly. The MOSFET will stay on as long as there is voltage difference and once the voltage level from the sensor reaches the reference voltage, the MOSFET will be turned off which stops current flow through the element. The power supply for the circuit is 12 v, which can heat up the board for 2-3 hours. In some embodiments, the heating element means comprises a Nichrome wire, which has well defined resistance and thermal property.

The heating element means functions to increase the temperature of ski body 110, and according to certain example embodiments, may comprise a Nichrome wire or another option. Nichrome wire heating elements have well defined resistance and derived current at different temperatures based on the measurement done in different conditions.

There are different wires based on the wire Gauge value that can be selected for various application. Using a typical rechargable battery (http://www.dhgate.com/product/the-large-capacity-rechargeable-lithium-battery/204392339.html.), which is 12 v and 7500 mAh, the battery life time (in hour) can be calculated according to this formula:

$$\text{Battery Life} = \frac{\text{Battery Capacity in Mili amps per hour}}{\text{Load Current in mili amps}} \times 0.70$$

For the Ski board (e.g., ski body 110) we would like to have a temperature gradient of approximately 10°. Assuming we use 24 inch Nichrome wires with Gauge size of 26, in order to increase the temperature from 32° F. to 42° F., we have to derive 0.36 A current with 12 v source. With a typical battery, the battery life time would be approximately (12 v and 7500 mAh)

$$\text{Battery Life} = \frac{7500}{360} \times 0.70 = 14.5 \text{ hours}$$

In some example embodiments, as discussed above, the battery pack (e.g., battery pack 210 of FIG. 2) may be removable and may be incorporated into the binding section for the skis (e.g., such as beneath the bindings 140 of FIG. 1), attached to the back of the boots (e.g., by a clip or similar fastening means), or just aft of the binding section (e.g., on the surface of the ski body 110 itself). For example, the battery pack 210 may be chargeable via a USB cable connectable to any USB power source or by any other DC V source, such as the 12 V DC source of a motor vehicle. As indicated, the battery's life may be extended during skiing/riding by the optional solar arrays or piezoelectric charge elements.

The stiffness control of the individual core elements is modulated and regulated by activating a heating element, such as coil or mesh that is built into the ski. The heating element is positioned adjacent to the core elements (e.g., Nitinol layer) to induce a phase change of the core elements by applying varying amounts of heat to the surface of the ski body, and directly to the core elements. The heating elements are operatively connected to the heating control module of the control unit 220 so as to maintain the desired temperature corresponding to the desired selected stiffness of the ski, by region or zone. The heating control module circuitry may also include temperature sensors embedded in the ski to provide feedback to the heating control module for regulating the desired temperature of one or more of the core elements. The shape memory components will have a heating element adjacent to them that can provide a rapid temperature rise adjustment of the element and therefore increase the stiffness parameter of the equipment.

In some embodiments, a ski boot may also be constructed with a distribution of core elements, such as in the form of a mesh lining (e.g., a Nitinol mesh lining) and a heating mesh between an external shell and an inner foam lining of the boot, and may connect to the battery pack 210 and heating control components of the control unit 220 adjacent to the bindings 140 (with a non-restrictive connection that will not affect ski release mechanisms based on the DIN settings). Heating of the boot heating mesh element may also be activated by the remote controller system or the app, resulting in a phase change of the mesh lining.

As previously indicated, the described system and the core elements (e.g., Nitinol based cores) can also be used to produce other useful sporting equipment where spring action is used and adjustable stiffness is a desirable attribute. Examples include diving boards, bats, archery equipment and protective equipment for all sports, where a change is stiffness upon contact/activation will provide additional protection to the athlete.

Figure 4:
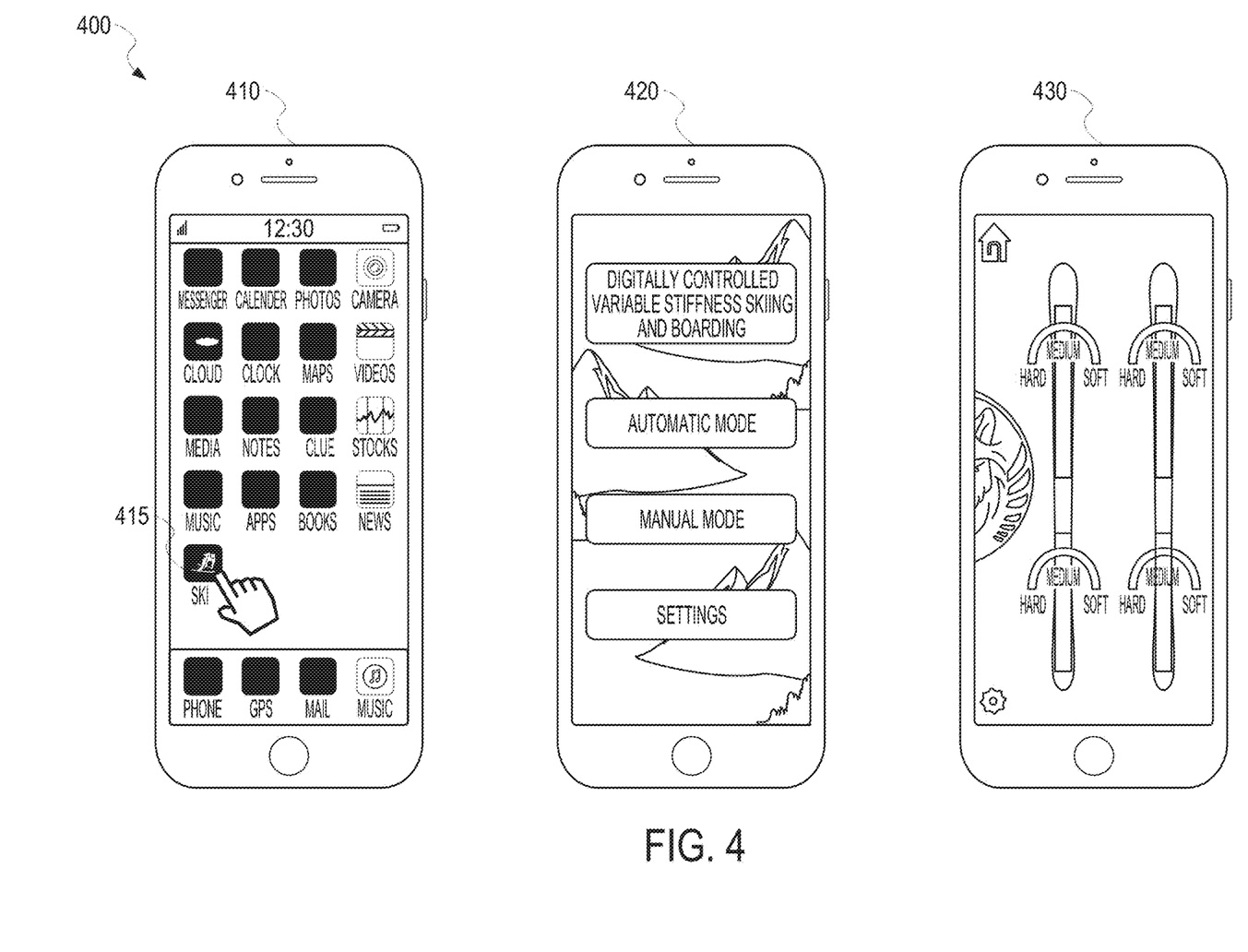
FIG. 4 is a depiction of graphical user interfaces of a variable stiffness application displayed at a mobile device, according to certain example embodiments.

FIG. 4 is a depiction of graphical user interfaces 410, 420, and 430 of a variable stiffness application 400 displayed at a mobile device, according to certain example embodiments. A user of a variable stiffness application 400 may control a stiffness parameter of an item of sporting equipment (e.g., a ski) through one or more inputs into the graphical user interfaces 410, 420, and 430. In some embodiments, the variable stiffness application may execute at a remote control that may be an independent unit or part of an existing communication system such as an application ("app") in a cell phone or other mobile computing device, such as a wristband that works in conjunction with a smart phone and app for ease of access. For example, as seen in interface 410, a user may execute the variable stiffness application 400 through the selection of a graphical icon 415 displayed within the interface 410.

The variable stiffness application 400 allows the athlete (e.g., user) to set a stiffness profile of one or more regions of the equipment, such as skis or snowboard. The stiffness profile may then be communicated by the client device to the control module 220 attached to the ski, through a communication means (e.g., WIFI, Bluetooth, or direct wired connection) where a communications module will convey signals to activate specific core elements to adjust the stiffness of the ski/snowboard as desired.

As shown in interface 420, the variable stiffness application 400 may allow the user to either manually or automatically set the stiffness profile of the different parts of the skis, such as one or more of its front mid-line core, a central mid-line core, a rear mid-line core, front inside edge, front outside edge, back inside edge, and a back outside edge. A manual mode will allow the skier to adjust the stiffness of each one of the stiffness elements cores of the skis based on the user's experience and preference.

An automatic mode may query the skier for the input of temperature, ski conditions, piste condition, and skiing style preferences, and cause the control unit 220 to automatically adjust the stiffness of the core elements based on pre-programmed options. The stiffness profile will then be communicated to the communications module and heating module, specific heating elements on the core elements may be controlled to modify the stiffness profile as desired and selected.

The variable stiffness application 400 may generate and cause display of the interface 430 in response to receiving a user input selecting the "manual mode" setting of the interface 420. In some embodiments, a similar, but not identical, interface may be displayed in response to receiving a user input selecting the "automatic mode" setting of the interface 420. For example, the automatic mode interface may simply include a presentation of one or more user selectable options to automatically configure a stiffness level of the item of sporting equipment. For example, a user may preconfigure stiffness settings and associate the preconfigured stiffness settings with a user profile, such that selection of an associated user profile identifier causes the variable stiffness application 400 to adjust a stiffness parameter of the item of sporting equipment by the control module 220.

The interface 430 may comprise a depiction of an item, such as skis, wherein a user may provide inputs into the interface 430 to set a stiffness parameter of individual regions of the items. The interface 430 may display a set of interactive graphical elements configured to receive user inputs setting a stiffness parameter. In response the variable stiffness application 400 communicates the stiffness parameters to the control module 220, which may thereby cause a corresponding phase change to one or more corresponding core elements.

As seen in interface 430, a user may opt to set a front region of a first ski to "hard," while setting a rear region of the first ski to "soft," and a front region of a second ski to "soft" and the rear region of the second ski to "hard." In this way, a user of the variable stiffness application may adjust a stiffness parameter of an item through user inputs into the interface 430.

Using shape memory alloys as part of the ski/snowboard core and/or shape memory alloys as a mesh in the boots, the skier or snowboarder can adjust the stiffness of these materials using the app on his/her smart phone through a Bluetooth connection or other remote system. Stiffness control of these materials is modulated by activating a lithium battery powered heating coil built into the ski and adjacent to the Nitinol layer to heat the Nitinol and induce phase change. This change in phase of the memory metal alloy will thus modify the stiffness profile of the skis, snowboard, or the boot at various parts of such equipment to respond to changes in terrain, ski conditions, snow quality, or expected performance parameters. The boot system will work in a similar way and may share the same power source as the skis/snowboard or have its own power source.

The approach presented here provides a revolutionary use of advanced materials and control technology to change the stiffness profile of a single set of skis/snowboard/boots during use, a feature that is not currently available in any existing product. The present invention provides a significant jump in the ability to design and manufacture a more responsive ski/snowboard/boot for the high performance and recreational skier that will allow the user to further enjoy their sport and potentially provide him/her with better protection against injury.

Currently, bending stiffness of a typical ski and a ski with embedded nitinol sheets has been compared in different situations. To study the effects of embedded nitinol sheet, a modern alpine ski is utilized. Finite element (FE) analysis is conducted to calculate bending stiffness of ski in different situations by ABAQUS software (ABAQUS version 6.13-2, Simulia, Providence, R.I., USA).

Figure 5:
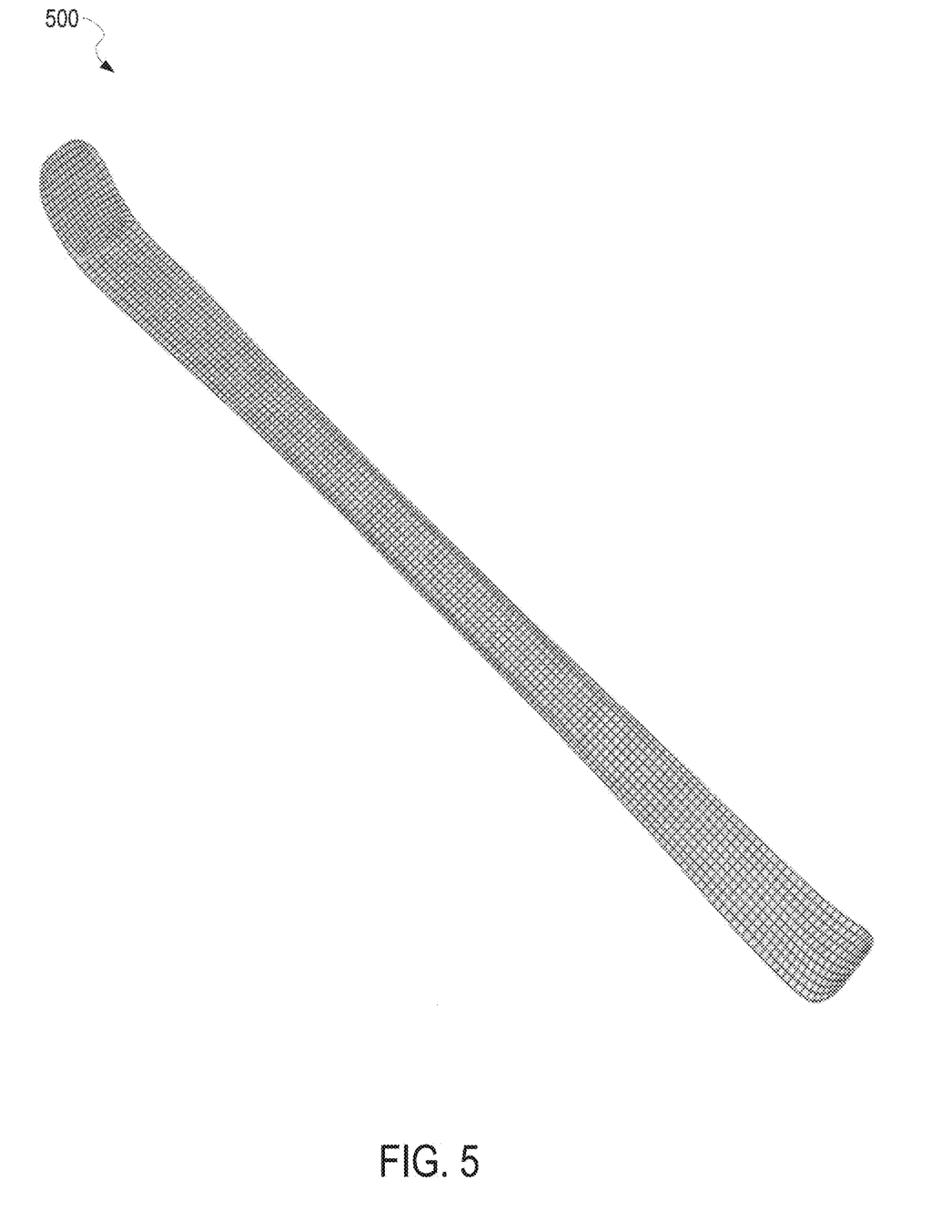
FIG. 5 is a depiction of a base geometry and mesh for composite layers, according to certain example embodiments.

FIG. 5 is a graphical model 500 of a ski on snow bulk, according to certain example embodiments. Briefly, fourteen different layers with various material properties and orientations are composited on the base geometry through composite layups. Also, we included nitinol sheets at the top and bottom of the composite structure of the model. Composite layers properties are presented in Table 1. Material properties of each material can be found in Table 2. Depending on nitinol sheet temperature, there will be two different material properties for it. In meshing process, element type of the base in ABAQUS is S4r, a 4-node element for curved shell.

TABLE 1

Composite Layups properties

| Layer | Material | Thickness (inch) | Rotation Angle | Integration Points |
|---|---|---|---|---|
| 1 | Nitinol | 0.015 | 0 | 3 |
| 2 | P-Tex | 0.06125 | 0 | 3 |
| 3 | Fiberglass | 0.011 | 0 | 3 |
| 4 | Fiberglass | 0.011 | 45 | 3 |
| 5 | Fiberglass | 0.011 | −45 | 3 |
| 6 | Poplar Wood | 0.06125 | 0 | 3 |
| 7 | Poplar Wood | 0.06125 | 0 | 3 |
| 8 | Poplar Wood | 0.06125 | 0 | 3 |
| 9 | Poplar Wood | 0.06125 | 0 | 3 |
| 10 | Poplar Wood | 0.06125 | 0 | 3 |
| 11 | Fiberglass | 0.011 | 0 | 3 |
| 12 | Fiberglass | 0.011 | 45 | 3 |
| 13 | Fiberglass | 0.011 | −45 | 3 |
| 14 | Basalt Ply | 0.011 | 0 | 3 |
| 15 | NYLON | 0.02 | 0 | 3 |
| 16 | Nitinol | 0.015 | 0 | 3 |

TABLE 2

Material properties of materials utilized in ski composite [1]

| Material | E (psi) | $\upsilon$ | E11 (psi) | E22 (psi) | $\upsilon$12 | G12 (psi) | G13 (psi) | G23 (psi) |
|---|---|---|---|---|---|---|---|---|
| Poplar Wood | | | 1738910 | 159980 | 0.318 | 130418 | 130418 | 19128 |
| Fiberglass | | | 6225300 | 1123462 | 0.2098 | 478798 | 478798 | 478798 |
| Basalt Ply | | | 8390950 | 1619352 | 0.2384 | 629914 | 629914 | 629914 |
| P-Tex | 87023 | 0.46 | | | | | | |
| Nylon | 377098 | 0.41 | | | | | | |
| Nitinol in low temperature | 3336000 | 0.33 | | | | | | |
| Nitinol in high temperature | 11603000 | 0.33 | | | | | | |

Figure 6:
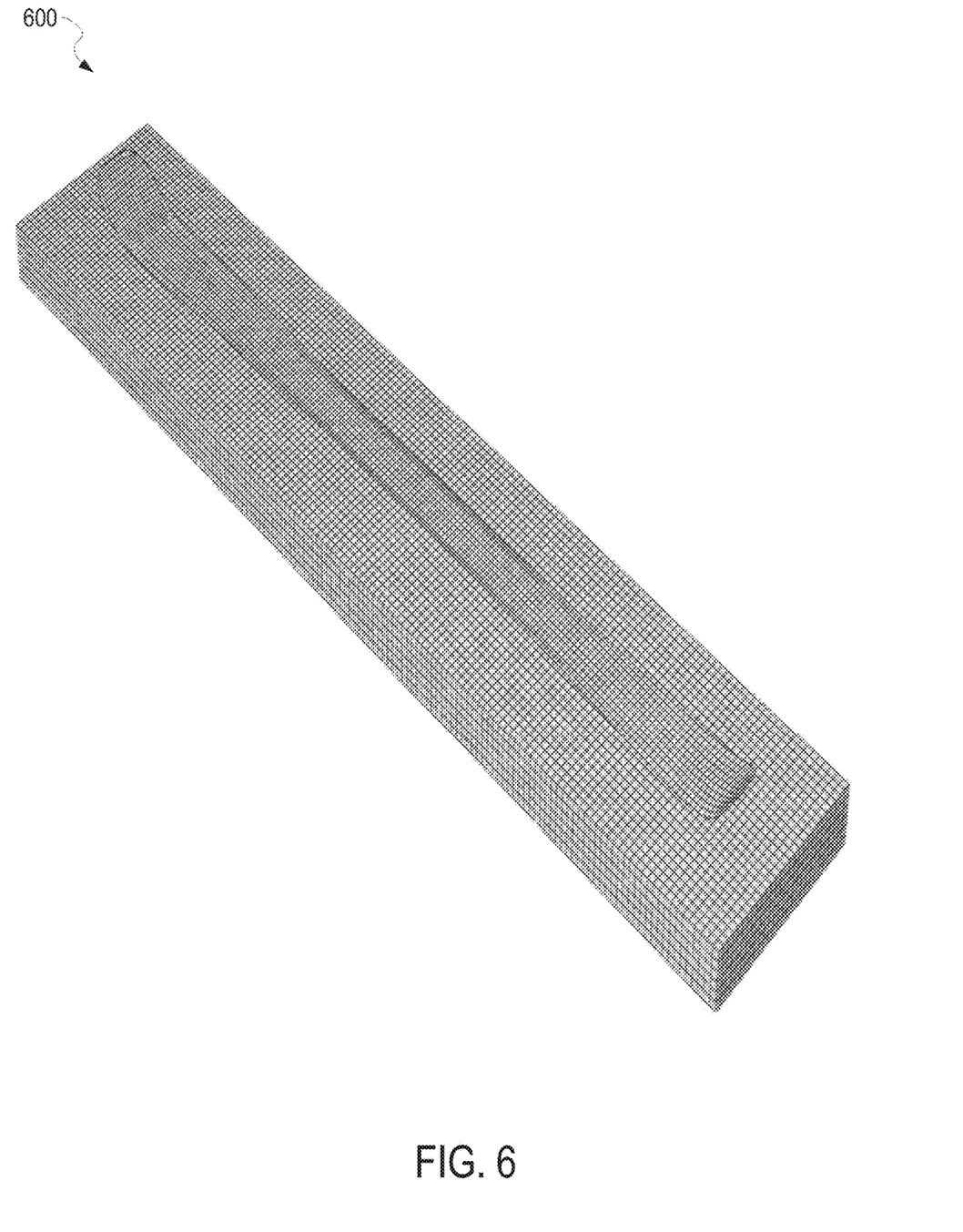
FIG. 6 is a modeling of a ski on snow bulk, according to certain example embodiments.

FIG. 6 is a graphical model 600 of a ski on snow bulk, according to certain example embodiments. The graphical model 600 depicts actual skiing in different positions with corresponding loading conditions and carving angles. Material properties of snow are different regarding to the type of snow (Table 3) [2]. Element type of snow in AI3AQUS is C3D8R, which is an 8-node linear brick.

TABLE 3

Material properties of different snow

| Material | E(psi) | $\upsilon$ |
|---|---|---|
| Fresh Snow | 145 | 0.05 |
| Compressed Snow | 14500 | 0.25 |

For loading and boundary conditions, the bottom of snow bulk is fixed. A general contact is defined between the bottom of ski and top of snow bulk. We consider three different carving angles: 0°, 20° and 40°. Needless to say, carving angle helps the skier to turn and maneuver quickly.

Figure 7:
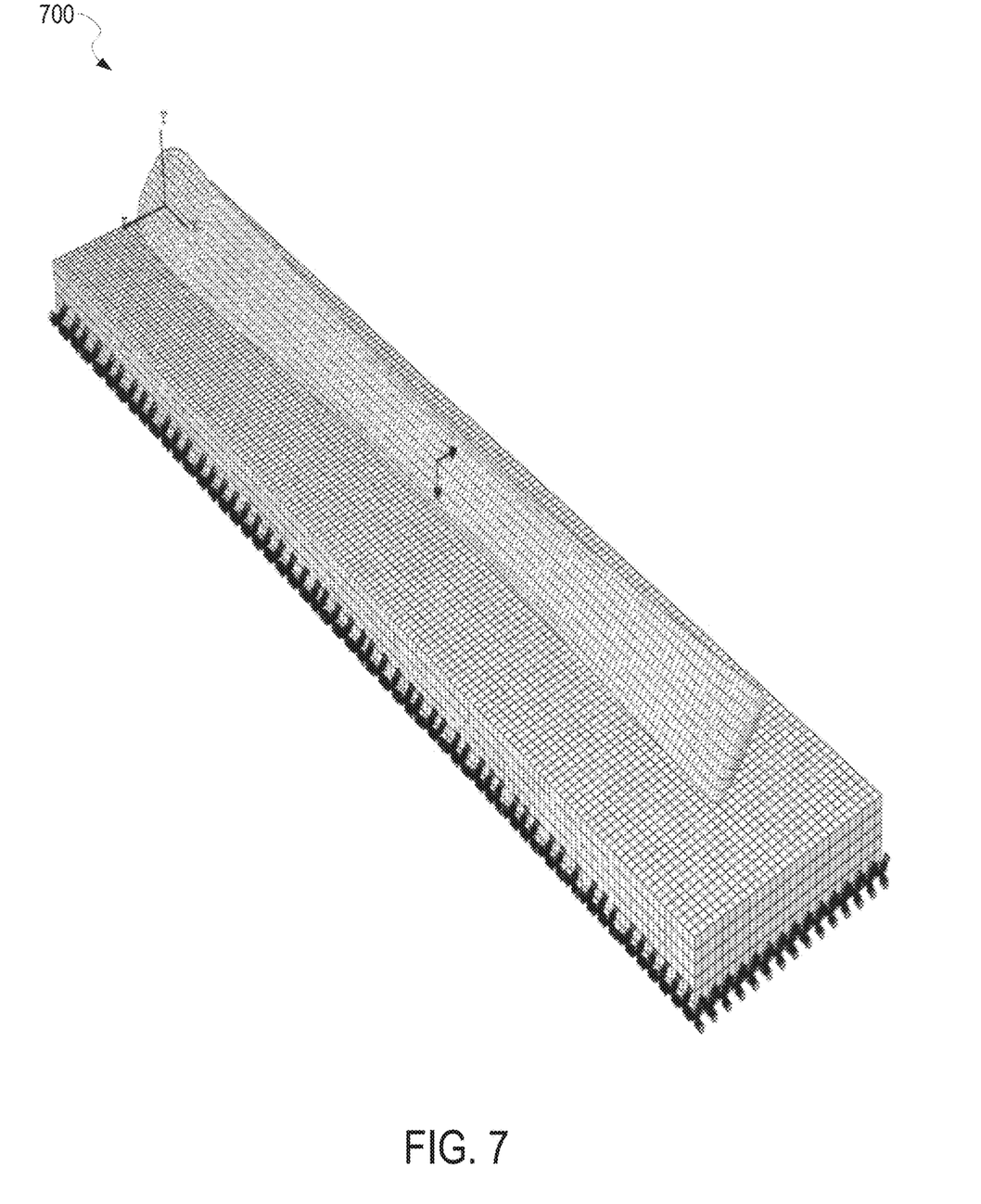
FIG. 7 is a depiction of a boundary and a loading condition, according to certain example embodiments.

FIG. 7 is a depiction 700 of a boundary and a loading condition, according to certain example embodiments. The depiction 700 illustrates different carving angles which lead to different loading conditions (Table 4). We studied the 4 bending behavior of the ski on two snow configurations. In soft snow configuration, there is 1 inch of fresh snow on the top of 2 inch compressed snow, while in hard snow configuration there is 3 inch of hard snow.

TABLE 4

Loading Conditions

| Carving Angle (°) | Radius of Turn (inch) | Velocity (inch/sec) | Vertical Weight (lb) | Horizontal Force (lb) |
|---|---|---|---|---|
| 0 | ∞ | 0 | 97.5 | 0 |
| 20 | 500 | 200 | 97.5 | 97.5 |
| 40 | 250 | 200 | 97.5 | 195 |

Figure 8:
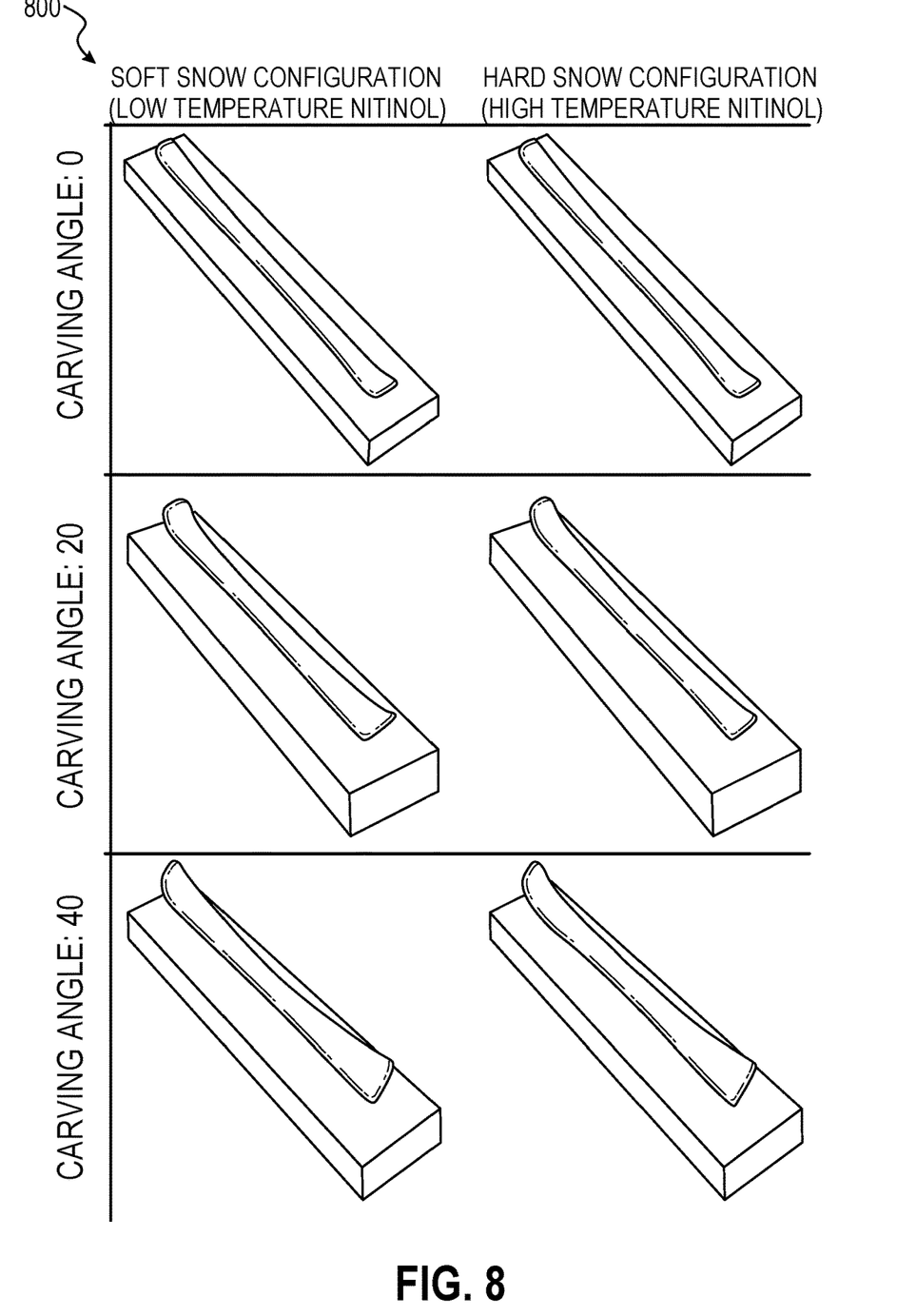
FIG. 8 is a depiction of a deflection of a ski with different nitinol properties, according to certain example embodiments.

FIG. 8 is a depiction 800 of a deflection of a ski with different nitinol properties, according to certain example embodiments. FE analysis is conducted to study effects of different nitinol properties on ski stiffness in different snow conditions. Table 5 compares bending stiffness of soft nitinol ski on soft snow configuration with bending stiffness of stiff nitinol ski on hard snow configuration. As seen, if we increase the temperature of nitinol, the stiffness of ski will be increased by 20%, 10% and 10%, approximately for carving angles of 0°, 20°, and 40° respectively.

TABLE 5

Ski stiffness and deflection in different nitinol states

| Carving Angle (°) | Equivalent Force (lb) | Deflection (inch) | | Ski Stiffness (lb/inch) | |
|---|---|---|---|---|---|
| | | Low T | High T | Low T | High T |
| 0 | 97.5 | 0.1476 | 0.1249 | 660.57 | 780.62 |
| 20 | 137.9 | 1.163 | 1.087 | 118.57 | 126.86 |
| 40 | 218.0 | 1.712 | 1.583 | 127.34 | 137.71 |

It should be understood, of course, that the foregoing relates to exemplary embodiments of the invention and that modifications may be made without departing from the spirit and scope of the invention as set forth in the following claims.

Figure 9:
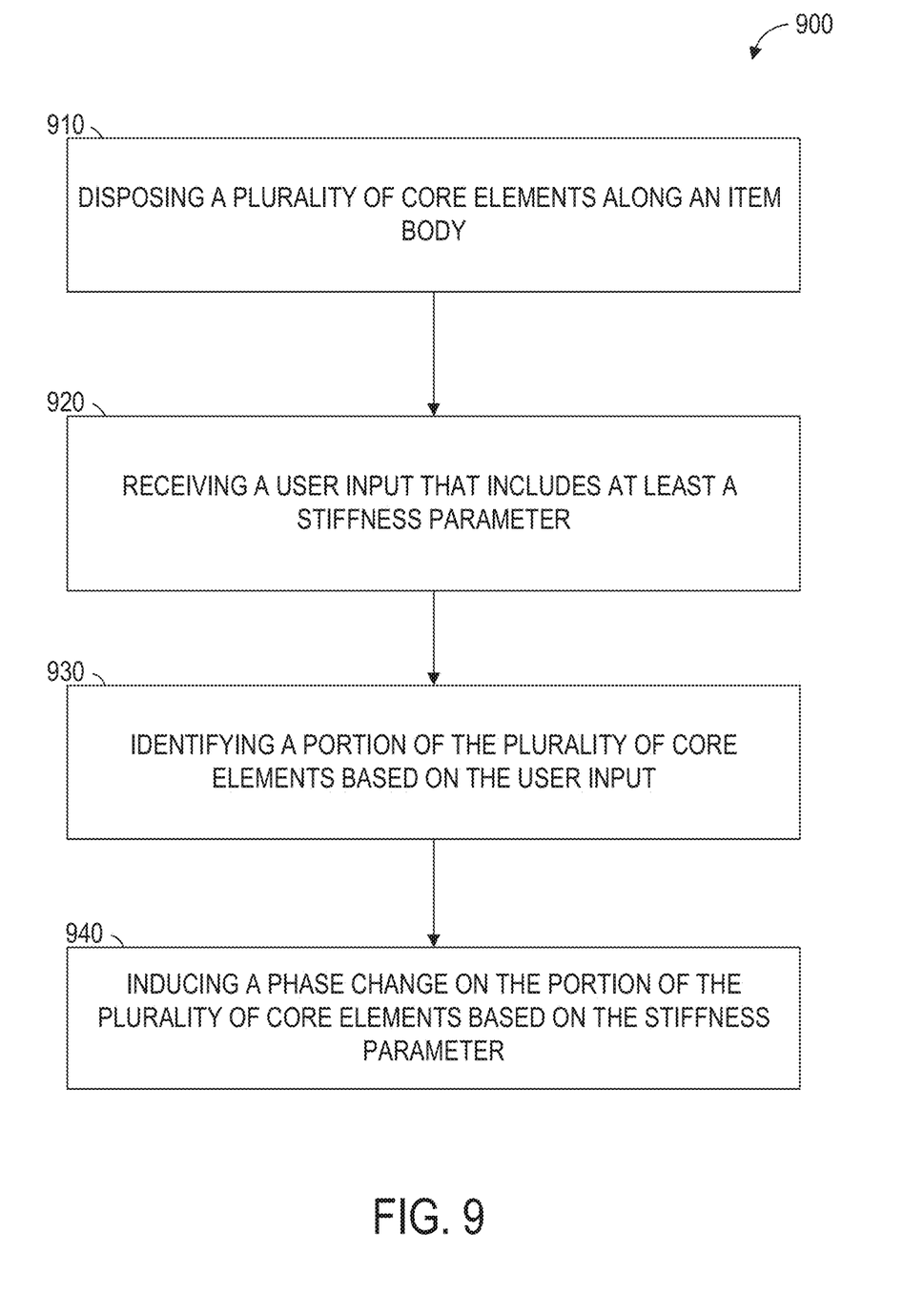
FIG. 9 is a flowchart illustrating a method for varying a stiffness parameter of a ski according to certain example embodiments.

FIG. 9 is a flowchart illustrating a method 900 for varying a stiffness parameter of a ski, according to certain example embodiments. Operations of the method 900 may be performed by the digitally controlled variable stiffness item and control unit depicted in FIGS. 1-3. As shown in FIG. 9, the method 900 includes operations 910, 920, 930, and 940.

At operation 910, a plurality of core elements formed of a thermally responsive material are disposed along an item. For example, the core elements may include a plurality of nitinol sheets dispersed along a body of an item. In some example embodiments, the plurality of core elements may be disposed along a first layer and a second layer, such that the first layer comprises a first portion of the plurality of core elements and the second layer comprises a second portion of the plurality of core elements.

At operation 920 the digitally controlled variable stiffness item receives a user input that comprises at least a stiffness parameter. In some example embodiments, the digitally controlled variable stiffness item may include an application module configured to generate and cause display of an interface at a client device, wherein the interface includes a depiction of locations of the plurality of core elements along an item body, and a menu that includes a presentation of a set of stiffness levels (e.g., soft, medium, hard, very hard). A user of the client device may provide the user input directly into the interface, such that the user input specifies at least a desired stiffness level.

In some embodiments, the user may specify a stiffness level of regions of the item body. For example, the user input may specify that a first portion of the item body be set to a first stiffness level (e.g., hard), while a second portion of the item body be set to a second stiffness level (e.g., soft). In further embodiments, the user input may simply specify a terrain type, or a stiffness value, and the digitally controlled variable stiffness item may determine an appropriate stiffness level based on the terrain type or stiffness value.

At operation 930, the digitally controlled variable stiffness item identifies a portion of the plurality of core elements based on the stiffness parameter of the user input. For example, a "soft" stiffness level may result in an identification of a first portion of the plurality of core elements, while a "medium," or "hard" stiffness level may result in an identification of a second portion of the plurality of core elements.

In some example embodiments, the user input may include an identification of the portion of the plurality of core elements. For example, the user input may identify one or more core elements from among the plurality of core elements, based on a selection from the user.

At operation 940, a phase change is induced to the portion of the plurality of core elements, based on the stiffness parameter. For example, one or more heating elements proximate to the portion of the plurality of core elements may apply a temperature value to the portion of the plurality of core elements based on the stiffness parameter.

What is claimed is:

1. A system for adjusting a stiffness parameter, the system comprising:
an item body, the item body comprising a first end and a second end;
a plurality of core elements disposed at positions along the item body, the plurality of core elements formed of a thermally responsive material, the plurality of core elements including at least a first core element and a second core element;
a heating element proximate to the plurality of core elements to impart a stiffness phase change on the thermally responsive material;
a control module comprising one or more processors to receive a user input that includes at least the stiffness parameter, and an identification of a portion of the plurality of core elements disposed along the item body, and to communicate the stiffness parameter and the identification of the portion of the plurality of core elements to the heating element;
an application module to cause display of an interface at a remote device in communication with the control module, the interface comprising a presentation of the item body that includes a display of the plurality of core elements within the presentation of the item body based on the positions of the plurality of core elements along the item body, and a menu element to receive a definition of the stiffness parameter, the display of the plurality of core elements including at least a first graphical element that corresponds with the first core element from among the plurality of core elements and a second graphical element that corresponds with the second core element, and wherein the system performs operations including:

receiving a user input from the remote device, the user input comprising a selection of the first graphical element and the second graphical element, and the definition of the stiffness parameter via the menu element; and imparting the stiffness phase change based on the definition of the stiffness parameter upon both the first core element and the second core element in response to the user input.

2. The system of claim 1, wherein the item body further comprises a middle region, and wherein the system further comprises:

a binding located along the middle region of the item body;

a battery pack located between the binding and the item body; and a charging element to provide an electrical charge to the battery pack.

3. The system of claim 2, wherein the charging element includes a piezoelectric strip disposed along the item body.

4. The system of claim 2, wherein the item body further comprises an upper surface and a lower surface, and the charging element includes a solar panel disposed along the upper surface of the item body.

5. The system of claim 1, wherein the menu element to receive the definition of the stiffness parameter comprises a value indicator, and wherein the receiving the definition of the stiffness parameter via the menu element includes:

receiving the definition of the stiffness parameter based on a position of the value indicator along the menu element.

6. The system of claim 1, wherein the heating in configured to perform operations comprising:

receiving the user input that includes the stiffness parameter and the identification of the portion of the plurality of core elements from the control module; and imparting the stiffness phase change to the portion of the plurality of core elements based on the stiffness parameter, in response to the receiving the user input.

7. The system of claim 1, wherein the thermally responsive material includes a shape memory alloy.

8. The system of claim 1, wherein the heating element includes an alloy wire embedded within the item of sporting equipment.

9. The system of claim 1, wherein the plurality of core elements comprise a first layer of core elements and a second layer of core elements.

10. A method for adjusting a stiffness parameter, the method comprising:

disposing a plurality of core elements along an item body, the plurality of core elements formed of a thermally responsive material, the plurality of core elements including at least a first core element and a second core element;

causing display of an interface at a client device, the interface comprising a presentation of the item body that includes a display of the plurality of core elements within the presentation of the item body based on the positions of the plurality of core elements along the item body, and a menu element to receive a definition of the stiffness parameter, the display of the plurality of core elements including at least a first graphical element that corresponds with the first core element and a second graphical element that corresponds with the second core element;

receiving a user input from the client device, the user input comprising at least the definition of the stiffness parameter via the menu element, and an identification of the first core element and the second core element from among the plurality of core elements;

determining a temperature value based on at least the stiffness parameter, in response to the receiving the user input; and inducing a phase change based on the definition of the stiffness parameter upon both the first core element and the second core element from among the plurality of core elements based on the temperature value.

11. The method for adjusting the stiffness parameter of claim 10, wherein the inducing the phase change of the core element includes:

applying heat to the portion of the plurality of core elements based on the temperature value, in response to the receiving the user input that includes the identification of the portion of the plurality of core elements.

12. The method of claim 11, wherein the applying heat to the portion of the plurality of core elements based on the temperature value further comprises:

heating a heating element proximate to the portion of the plurality of core elements based on the temperature value.

13. The method of claim 10, wherein the menu element to receive the definition of the stiffness parameter comprises a value indicator, and wherein the receiving the definition of the stiffness parameter via the menu element includes:

receiving the definition of the stiffness parameter based on a position of the value indicator along the menu element.

14. The method of claim 10, wherein the method further comprises:

detecting a temperature of the item body;

generating an electric signal based on the temperature;

calculating a difference between the electric signal and a reference signal, the reference signal based on the stiffness parameter; and inducing the phase change on the portion of the plurality of core elements based on the difference.

15. The method of claim 10, wherein the thermally responsive material includes a shape memory alloy.

16. The method of claim 10, wherein the plurality of core elements comprise a first layer of core elements and a second layer of core elements.

17. The method of claim 10, wherein the identification of the portion of the plurality of core elements is based on the stiffness parameter.

18. An apparatus comprising:

an item body comprising a first end and a second end;

a plurality of core elements disposed at positions along the item body, the plurality of core elements formed of a thermally responsive material, the plurality of core elements including at least a first core element and a second core element;

a heating element proximate to the plurality of core elements to impart a stiffness phase change on the thermally responsive material;

a control module comprising one or more processors to receive a user input that includes at least the stiffness parameter, and an identification of a portion of the plurality of core elements disposed along the item body, and to communicate the stiffness parameter and the identification of the portion of the plurality of core elements to the heating element;

an application module to cause display of an interface at a remote device in communication with the control module, the interface comprising a presentation of the item body that includes a display of the plurality of core elements within the presentation of the item body based on the positions of the plurality of core elements along the item body, and a menu element to receive a definition of the stiffness parameter, the display of the plurality of core elements including at least a first graphical element that corresponds with the first core element from among the plurality of core elements and a second graphical element that corresponds with the second core element, and wherein the system performs operations including:

receiving a user input from the remote device, the user input comprising a selection of the first graphical element and the second graphical element, and the definition of the stiffness parameter via the menu element; and imparting the stiffness phase change based on the definition of the stiffness parameter upon both the first core element and the second core element in response to the user input.

19. The apparatus of claim 18, wherein the apparatus further comprises:

an application module to cause display of an interface at a remote controller, the interface comprising a presentation of a depiction of the item body and the plurality of core elements disposed along the item body, and to receive the user input through the interface.

\* \* \* \* \*